Patented Dec. 4, 1928.

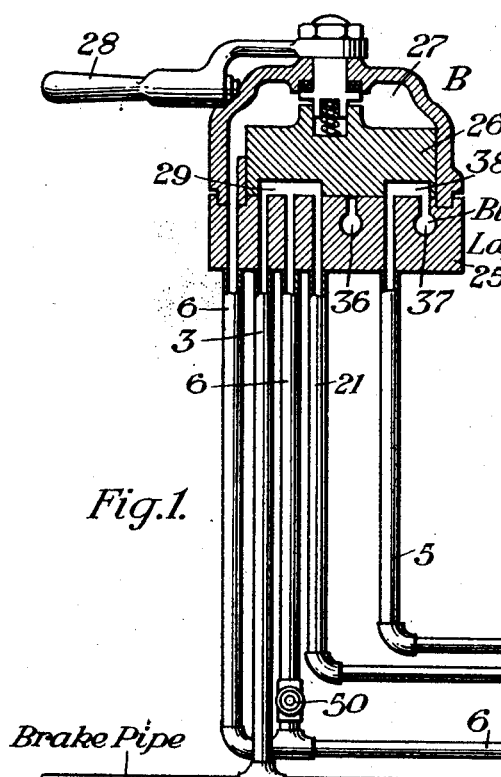
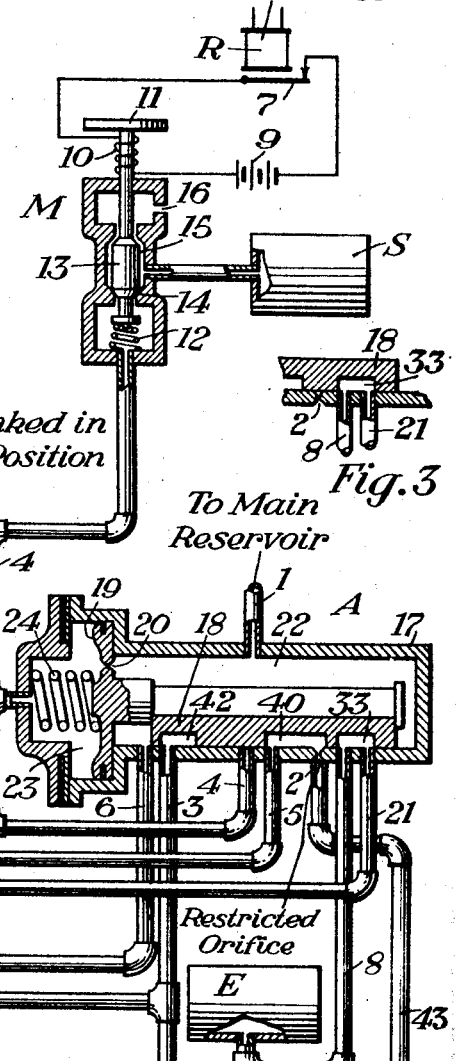
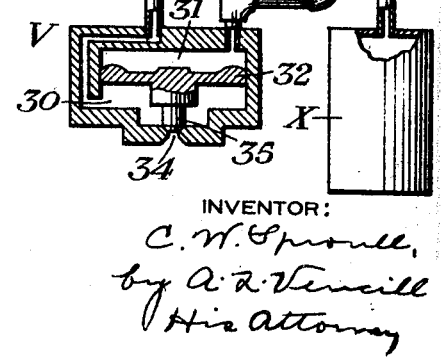

1,694,193

UNITED STATES PATENT OFFICE.

CLARENCE W. SPROULL, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

FLUID-PRESSURE BRAKING APPARATUS.

Application filed October 9, 1926. Serial No. 140,451.

My invention relates to fluid pressure braking apparatus, and particularly to automatic brake applying mechanism. More particularly my invention relates to means for controlling the automatic application of the brakes on a railway train.

I will describe one form of apparatus embodying my invention, and then point out the novel features thereof in claims.

In the accompanying drawings Fig. 1 is a diagrammatic view showing one form of fluid pressure braking apparatus embodying my invention, the various valves being shown in section. Fig. 2 is a fragmentary sectional view of the engineman's brake valve in service position. Fig. 3 is a fragmental view showing one modification of a portion of the apparatus shown in Fig. 1.

Referring first to Fig. 1, the reference character R designates a train carried relay which is controlled in accordance with traffic conditions in advance of the train. Under normal conditions with the trackway ahead of the train unoccupied, the relay is energized, thus holding its contact 7 closed. Under these conditions battery 9 supplies current to winding 10 of a magnet valve M, so that armature 11 of the magnet valve M is held down against the action of a spring 12 and the pressure in pipe 4, thus holding valve 13 against the valve seat 14 and away from the valve seat 15 so that stop reservoir S is open to atmosphere through opening 15 and port 16.

The magnet valve M serves to control the automatic application of the brakes on the train through an automatic application valve A. The brakes may also be applied manually by means of the engineman's brake valve B.

The application valve A comprises a valve body 17 divided into two chambers 22 and 23 by means of a piston 19. The piston 19 is arranged to operate a slide valve 18, when moved toward the left against the action of spring 24. Fluid pressure is normally supplied from some convenient source, such as the main reservoir, to the chamber 22 through pipe 1. Piston 19 is provided with a leak port 20 which allows the pressure in chamber 23 to build up to that of the source 1 when pipe 4 is blanked by slide valve 18 and by valve 13. When the pressure is the same in both chambers the piston 19 is held in its right hand or release position by spring 24.

The chamber 23 of valve A is connected to the magnet valve M by means of the pipe 4 which is normally charged to main reservoir pressure from chamber 23. Pipe 4 may also be connected with pipe 5 by means of port 40 in slide valve 18 under certain conditions which will appear hereinafter.

Chamber 22 of valve A is normally connected, by means of pipe 6 and feed valve 50 with the engineman's brake valve B. Valve B comprises a valve seat 25, a rotary member 26, and a valve chamber 27. The abutting surfaces of the valve seat 25 and rotary member 26 are provided with valve ports, certain of which may be brought into registration by manipulation of handle 28. When the brake valve B is in the running position, fluid pressure is constantly supplied from main reservoir through chamber 22 of valve A pipe 6 and feed valve 50, to port 29 in member 26. Port 29 connects pipe 6 with the usual brake pipe 3 which is arranged to initiate an application of the brakes on the train when the pressure in the pipe is reduced. Main reservoir pressure is supplied to chamber 27 in valve B through pipe 6.

Pipe 3 normally delivers brake pipe pressure to the lower chamber 30 of an equalizing valve V. This valve has two chambers 30 and 31 separated by a piston 32, which is normally in its lower position, the chamber 31 being supplied with brake pipe pressure from pipe 6, through feed valve 50, port 29 in the brake valve B, pipe 21, port 33 in slide valve 18, and pipe 8. It will thus be seen that under normal conditions brake pipe pressure is supplied to both chambers of the valve V so that vent 34 is closed by plunger 35, piston 32 being in its lower position.

Brake pipe pressure is also supplied to an equalizing reservoir E which is connected with pipe 8, but the pressure in this reservoir is reduced when valve A is moved to the left hand position. This may be accomplished, as shown in Fig. 1, by connecting pipe 8 through a port 33 in the slide valve 18, a restricted orifice 2, and pipe 43 with a reservoir X which is normally connected with atmosphere as will be plain from the drawing.

The reduction in the equalizing reservoir pressure may also be made as shown in Fig. 3, by venting the reservoir directly to atmosphere through the orifice 2 instead of through this orifice into the reservoir X.

If a manual service application of the brakes is desired the engineman moves the brake valve B to the service position (as shown in Fig. 2). This blanks pipes 3 and 6 and connects pipe 21 to atmosphere through ports 29 and 36. The equalizing reservoir E and chamber 31 of equalizing valve V will be vented to atmosphere through pipe 8, port 33 in valve A, pipe 21, and ports 29 and 36. As soon as the pressure in chamber 31 falls below that in chamber 30 the piston 32 will be forced upward. Brake pipe 3 will therefore be opened to atmosphere through vent 34 and the brakes will be applied. When the speed of the train has decreased sufficiently the engineman may release the brakes by moving the brake valve to the running position. Pressure is then supplied to both chambers 30 and 31 of the equalizing valve V, piston 32 is pushed downward by the pressure above it to close vent 34, and brake pipe 3 and equalizing reservoir E are again charged to normal pressure. The mode of operation of the apparatus during an automatic application is as follows:

When the relay R becomes de-energized, valve 13 is pushed upwardly against seat 15 under the action of spring 12 and the pressure in pipe 4. Reservoir S is then disconnected from atmosphere, and is connected with pipe 4, and hence with chamber 23 of valve A. The pressure in chamber 23, therefore falls, and piston 19 is forced into its left hand position by the pressure in chamber 22. Slide valve 18, in moving to the left hand position connects pipes 3 and 6 by means of port 42, thus cutting off the supply of main reservoir pressure to the engineman's brake valve B and also blanks pipe 21. The same operation of valve A connects pipe 8 with orifice 2 so that the pressure in reservoir E is reduced. The piston 32 of valve V, therefore rises, venting the brake pipe 3 through vent 34 in such manner that the rate of pressure reduction in brake pipe 3 will be substantially the same as the rate of reduction in reservoir E. If the brake pipe is in a leaky condition so that the rate of pressure reduction due to leakage is greater than that at which the pressure is reduced in the equalizing reservoir E, the vent 34 will not open at all, but the brake application resulting will be due solely to brake pipe leakage.

In moving to the left, slide valve 18 also connects pipes 4 and 5 by means of port 40 so that pipe 4 and stop reservoir S are vented to atmosphere through pipe 5, port 38 in brake valve B, and discharge orifice 37. This prevents pressure from building up in pipe 4 and returning piston 19 of valve A to its right hand position without brake valve B first being moved to the lap position.

After an automatic application has been made the brakes can be released only after the brake valve B has been moved to the lap position, in which all pipes 3, 5, 6 and 21 and also openings 36 and 37 are blanked by rotary member 26 of valve B. The closing of orifice 37 permits pressure from main reservoir to gradually restore the pressure in chamber 23 of valve A by building up in reservoir S and pipe 4 through leak port 20, until the piston 19 is moved to the right by spring 24. As soon as valve A is restored to normal, valve B may be restored to running position. Main reservoir pressure is then again supplied through chamber 22, pipe 6 feed valve 50 and port 29 in valve B to recharge brake pipe 3. Pressure is also supplied from port 29 in valve B, through pipe 21, port 33 and pipe 8 to reservoir E and chamber 31 to restore piston 32 of valve V to its normal closed position. As soon as traffic conditions are such as to energize relay R again, valve 13 will be forced downward against seat 15 thus venting reservoir S to atmosphere.

One method of avoiding excessive train shocks, especially during automatic applications when large and rapid reductions in brake pipe pressure are made, is to employ split reduction. In this mode of application, the brake pipe pressure is first reduced by a small amount, and after this reduction is complete a second and larger reduction is made. The shock effects due to difference in time required for brake pipe reduction to take place in the two ends of a long train are thus materially reduced.

In standard practice the brake pipe pressure is usually 70 pounds per square inch, and under such condition it has been found to be impracticable to reduce the brake pipe pressure on a train of 100 cars at a greater rate than 15 pounds from 70 pounds in approximately 25 seconds, if unreasonably severe shocks between cars are to be avoided. I, therefore, propose to simplify the apparatus employed in automatic applications by so proportioning the volume of the equalizing reservoir E and the discharge orifice 2 that the pressure in the equalizing reservoir is reduced at approximately this rate. In order to accomplish a reduction of 15 pounds from 70 pounds in approximately 25 seconds, I have discovered that the equalizing reservoir should have a volume between 2500 and 4300 cubic inches, if the discharge orifice has a diameter of 1/16 inch, and vents the reservoir directly to atmosphere as in Fig. 3, the exact volume depending somewhat upon the lengths of the various pipes used in the system.

With the apparatus arranged to reduce the equalizing reservoir pressure 15 pounds in not less than 25 seconds, I have found that undesirable shocks are materially reduced, and the danger of injury to crew or lading is correspondingly decreased.

It will thus be seen that my arrangement of equalizing reservoir and reduction discharge orifice accomplishes substantially the same results as are obtained by means of split reduction and materially simplifies the apparatus by eliminating the reservoirs and valves which are necessary for automatic split reduction.

Although I have shown and described only one form of fluid pressure braking apparatus embodying my invention, it is understood that various changes and modifications may be made therein within the scope of the appended claims without departing from the spirit and scope of my invention.

Having thus described my invention, what I claim is:

1. In automatic fluid pressure braking apparatus comprising an equalizing reservoir normally charged with fluid pressure, brake applying mechanism responsive to the pressure in said reservoir, and means for at times automatically reducing the pressure in said reservoir at a rate not exceeding 15 pounds in 25 seconds.

2. In combination with automatic fluid pressure braking apparatus comprising an equalizing reservoir normally charged with fluid pressure, an automatic brake application valve, and means controlled by said valve for at times reducing the pressure in said reservoir at a rate not exceeding 15 pounds in 25 seconds.

3. In combination with automatic fluid pressure braking apparatus comprising an equalizing reservoir normally charged with fluid pressure, to approximately 70 pounds per square inch, an automatic brake application valve, and means controlled by said valve for at times reducing the pressure in said reservoir to approximately 55 pounds in at least 25 seconds.

4. In automatic brake applying apparatus an equalizing reservoir having a volume between 2500 and 4300 cubic inches, means for normally charging the reservoir with fluid pressure, an equalizing valve responsive to the pressure in said reservoir for controlling the pressure in the brake pipe, and means for at times discharging the reservoir through an orifice substantially 1/16 inches in diameter.

5. In automatic brake applying apparatus an equalizing reservoir having a volume between 2500 and 4300 cubic inches, means for normally charging the reservoir with fluid pressure at approximately 70 pounds per square inch, an equalizing valve responsive to the pressure in said reservoir for controlling the pressure in the brake pipe, and means for at times discharging the reservoir through an orifice substantially 1/16 inches in diameter.

6. In automatic brake applying apparatus an equalizing reservoir having a volume between 2500 and 4300 cubic inches, means for normally charging the reservoir with fluid pressure at approximately 70 pounds per square inch, an equalizing valve responsive to the pressure in said reservoir for controlling the pressure in the brake pipe, an automatic brake application valve and means controlled by said application valve for at times connecting the reservoir with atmosphere through an orifice approximately 1/16 inches in diameter.

In testimony whereof I affix my signature.

CLARENCE W. SPROULL.